(12) United States Patent
Rekimoto

(10) Patent No.: US 10,733,852 B2
(45) Date of Patent: Aug. 4, 2020

(54) SIGNAL CONTROL DEVICE AND SIGNAL CONTROL SYSTEM

(71) Applicant: SONY CORPORATION, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 15/891,665

(22) Filed: Feb. 8, 2018

(65) Prior Publication Data

US 2018/0165928 A1 Jun. 14, 2018

Related U.S. Application Data

(63) Continuation of application No. 14/317,195, filed on Jun. 27, 2014, now abandoned.

(30) Foreign Application Priority Data

Jul. 5, 2013 (JP) .................. 2013-141867

(51) Int. Cl.
*G08B 6/00* (2006.01)
*H04M 1/725* (2006.01)
*G01C 21/36* (2006.01)

(52) U.S. Cl.
CPC .......... *G08B 6/00* (2013.01); *G01C 21/3652* (2013.01); *H04M 1/72594* (2013.01); *H04M 2250/10* (2013.01)

(58) Field of Classification Search
CPC ......... G08B 6/00; G09B 21/003; G06F 3/016; G01C 21/3652; H04M 1/72594; H04M 2250/10
See application file for complete search history.

(56) References Cited

U.S. PATENT DOCUMENTS

| 5,999,168 A | 12/1999 | Rosenberg et al. |
| 6,693,622 B1 * | 2/2004 | Shahoian ................ G06F 3/016 345/156 |
| 6,801,247 B1 * | 10/2004 | Ohishi ............... H04N 5/23248 348/208.1 |
| 2005/0134562 A1 * | 6/2005 | Grant ..................... G06F 3/016 345/161 |

(Continued)

OTHER PUBLICATIONS

Amemiya, et al., "Phantom-DRAWN: Direction Guidance Using Rapid and Asymmetric Acceleration Weighted by Nonlinearity of Perception", 15th International Conference on Artificial Reality and Telexistence, Christchurch, New Zealand, Dec. 5-8, 2005.

(Continued)

*Primary Examiner* — Hai Phan
*Assistant Examiner* — Anthony D Afrifa-Kyei
(74) *Attorney, Agent, or Firm* — Chip Law Group

(57) ABSTRACT

There is provided a signal control device including a signal output unit that outputs a signal for a vibratory device, and a signal control unit that controls the signal. Between a case where a change from a reference level to a first level is exerted on the signal and a case where a change from the first level to the reference level is exerted on the signal, magnitudes of variation amounts of acceleration per unit time generated in the vibratory device are different from each other. The signal control unit exerts the change from the reference level to the first level and the change from the first level to the reference level on the signal.

10 Claims, 8 Drawing Sheets

(56) References Cited

U.S. PATENT DOCUMENTS

| | | |
|---|---|---|
| 2005/0275508 A1 | 12/2005 | Orr et al. |
| 2007/0040871 A1* | 2/2007 | Urano .................... H02N 2/142 347/68 |
| 2012/0007713 A1* | 1/2012 | Nasiri ................... G06F 1/1694 340/5.81 |
| 2012/0319951 A1 | 12/2012 | Lee |
| 2013/0218456 A1* | 8/2013 | Zelek ................. G01C 21/3652 701/412 |
| 2014/0015652 A1* | 1/2014 | Han ........................ G08B 6/00 340/407.1 |
| 2014/0379251 A1 | 12/2014 | Tolstedt et al. |

OTHER PUBLICATIONS

Notice of Allowance for U.S. Appl. No. 14/317,195, dated Feb. 12, 2018, 02 pages.
Notice of Allowance for U.S. Appl. No. 14/317,195, dated Jan. 10, 2018, 02 pages.
Notice of Allowance for U.S. Appl. No. 14/317,195, dated Nov. 17, 2017, 09 pages.
Advisory Action for U.S. Appl. No. 14/317,195, dated Sep. 26, 2016, 03 pages.
Non-Final Office Action for U.S. Appl. No. 14/317,195, dated Apr. 7, 2017, 06 pages.
Final Office Action for U.S. Appl. No. 14/317,195, dated Jul. 1, 2016, 06 pages.
Non-Final Office Action for U.S. Appl. No. 14/317,195, dated Dec. 18, 2015, 05 pages.

* cited by examiner

FIG.10
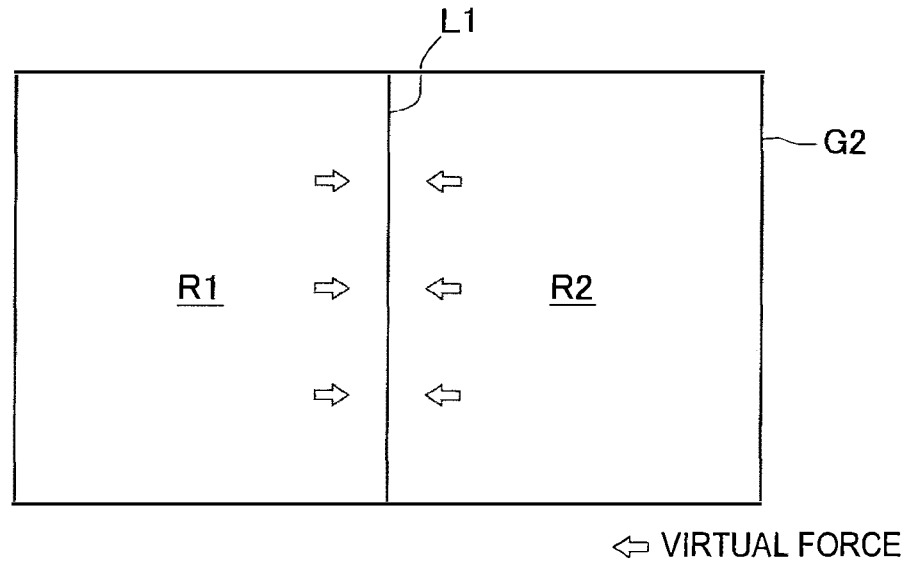
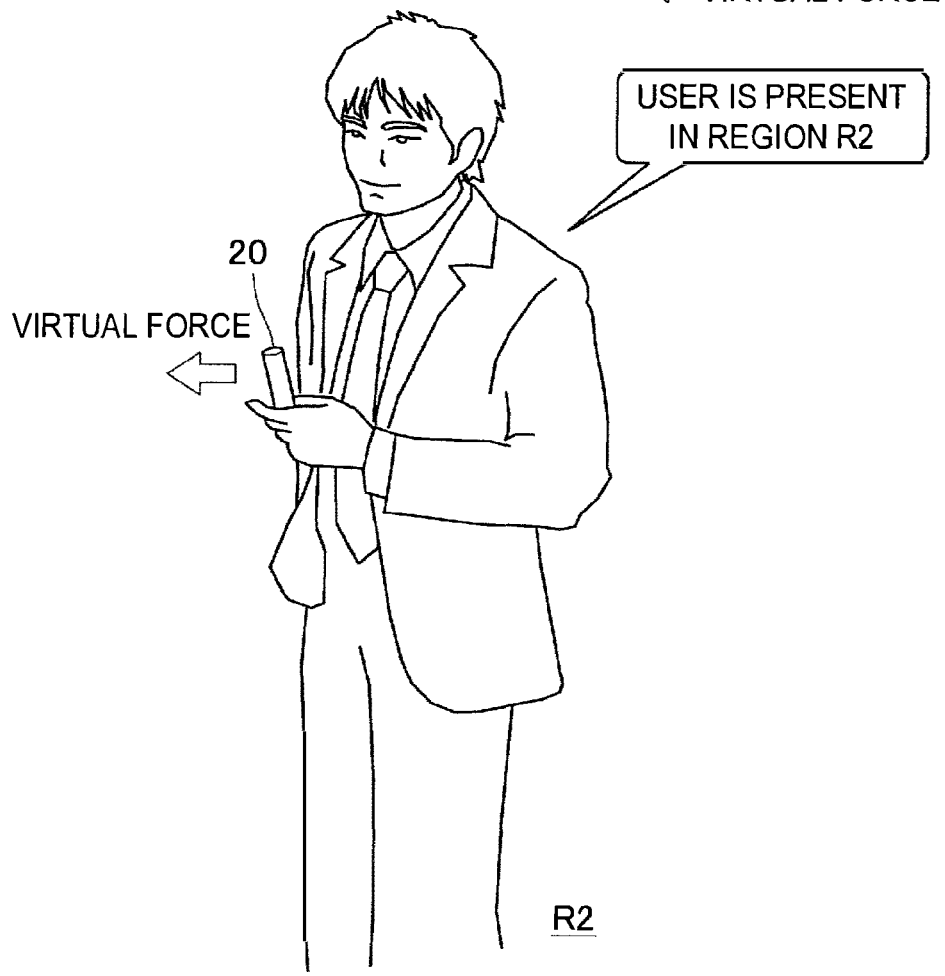

SIGNAL CONTROL DEVICE AND SIGNAL CONTROL SYSTEM

CROSS REFERENCE TO RELATED APPLICATIONS

The present application is a continuation application of U.S. patent application Ser. No. 14/317,195, filed on Jun. 27, 2014, which claims benefit of priority from Japanese Patent Application 2013-141867 filed in the Japan Patent Office on Jul. 5, 2013, the entire contents of each of the above are hereby incorporated by reference.

BACKGROUND

The present disclosure relates to a signal control device and a signal control system.

Human tactile perception has been known to have non-linear characteristics. In other words, a relationship between a force actually acting on a user and a force sensation sensed by the user when the user perceives the force actually acting on himself/herself is not a simple proportional relationship, but may follow an S-curve. Amemiya et al. have proposed a device generating a force sensation as a human perception by rotating a crank device with use of the nonlinear characteristics (e.g. Amemiya, T., Ando, H., and Maeda, T. Phantom-drawn: direction guidance using rapid and asymmetric acceleration weighted by nonlinearity of perception. In Proceedings of the 2005 international conference on Augmented tele-existence, ICAT '05 (2005), 201-208).

SUMMARY

However, technology is demanded which inhibits potential of an enlarged scale of a whole device as well as can give the user the force sensation.

According to an embodiment of the present disclosure, there is provided a signal control device including a signal output unit configured to output a signal for a vibratory device, and a signal control unit configured to control the signal. Between a case where a change from a reference level to a first level is exerted on the signal and a case where a change from the first level to the reference level is exerted on the signal, magnitudes of variation amounts of acceleration per unit time generated in the vibratory device are different from each other. The signal control unit exerts the change from the reference level to the first level and the change from the first level to the reference level on the signal.

According to an embodiment of the present disclosure, there is provided a signal control system including a vibratory device, and a signal control device. The signal control device includes a signal output unit configured to output a signal for the vibratory device, and a signal control unit configured to control the signal. The signal control unit exerts a change from a reference level to a first level and a change from the first level to the reference level on the signal. Between a case where the change from the reference level to the first level is exerted on the signal and a case where the change from the first level to the reference level is exerted on the signal, magnitudes of variation amounts of acceleration per unit time generated in the vibratory device are different from each other.

As described above, according to the present disclosure, the technology can be provided which inhibits potential of an enlarged scale of a whole device as well as can give the user the force sensation.

BRIEF DESCRIPTION OF THE DRAWINGS

FIG. 10 is a diagram for explaining a second exemplary use of the signal control system.

DETAILED DESCRIPTION OF THE EMBODIMENT(S)

Figure 1:
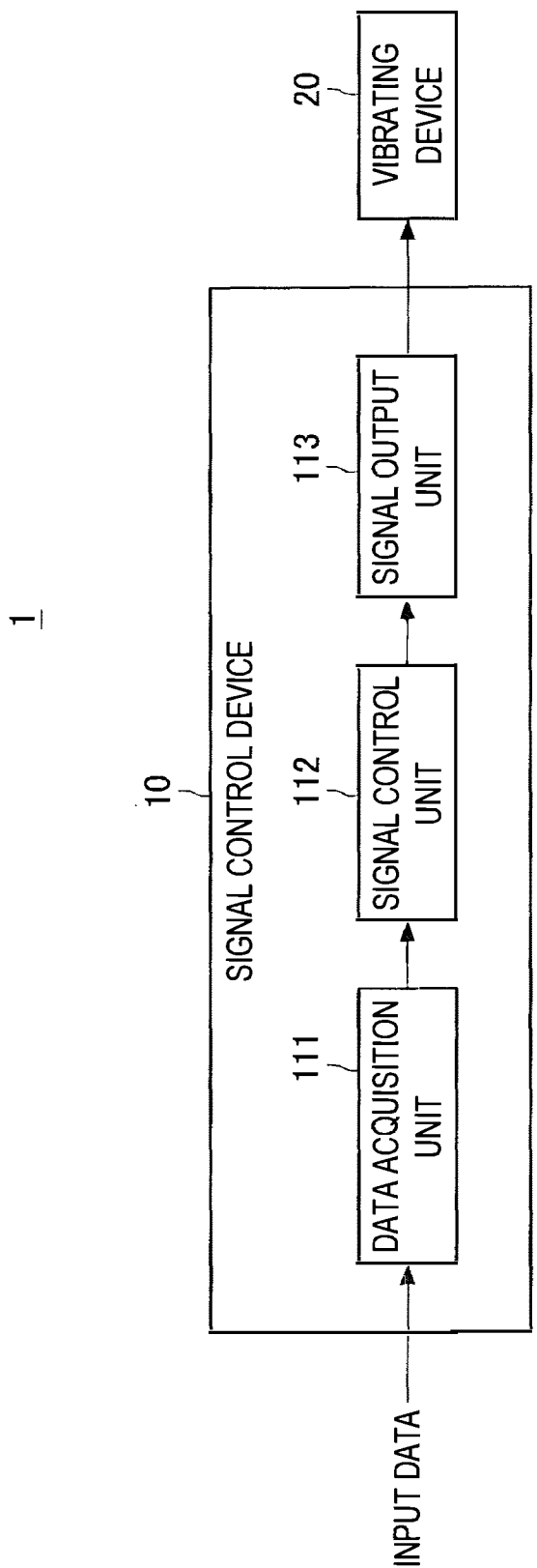
FIG. 1 is a diagram illustrating an exemplary configuration according to an embodiment of the present disclosure signal control system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the appended drawings, plural structural elements that have substantially the same function and structure are denoted with the same reference numerals followed by different alphabetical letters or numerals for distinction in some cases. However, if the plural structural elements that have substantially the same function and structure are not necessarily to be distinguished from one another, they are denoted with the same reference numerals only.

The DETAILED DESCRIPTION OF THE EMBODIMENT is given according to in the following order of items.
1. Outline of signal control system
2. Functions of signal control system
3. Exemplary use of signal control system
4. Conclusion

1. Outline of Signal Control System

First, a description is given of a signal control system 1 according to an embodiment of the present disclosure. In recent years, various technologies have been proposed as a technology for giving a user a force sensation or tactile sense in a user interface. For example, as examples of a technology for giving a user a force sensation or tactile sense, there have been proposed a technology actually applying a force to the user, a technology giving the user a vibration, and the like, Here, in the case of the technology actually applying a force to the user, it is necessary that an object for applying a force to the user be connected with a fixed object by way of a mechanism element or wire, which is likely to lead to an enlarged scale of a whole device. Therefore, the technology actually applying a force to the user may not be easily applied to a small-sized terminal such as a mobile device.

In the case of the technology giving the user a vibration, a vibration can be transmitted to the user. However, it is difficult to transmit an actual force acting in a certain direction to the user. This is because integration of accelerations of a certain time period or more due to the vibration almost results in zero.

On the other hand, human tactile perception is known to have nonlinear characteristics. In other words, a relationship between a force actually acting on the user and a force sensation sensed by the user when the user perceives the force actually acting on himself/herself is not a simple proportional relationship, but may follow an S-curve. Amemiya et al. have proposed a device generating a force sensation as a human perception by rotating a crank device with use of the nonlinear characteristics (e.g. Amemiya, T., Ando, H., and Maeda, T. Phantom-drawn: direction guidance using rapid and asymmetric acceleration weighted by nonlinearity of perception. In Proceedings of the 2005 international conference on Augmented tele-existence, ICAT '05 (2005), 201-208).

In the case of using this device, it is difficult to transmit an actual force acting in a certain direction to the user, but it is possible to make the user feel as if a force acting in a certain direction is generated by using trick of human. However, this device includes a flywheel and a crank, which is likely to lead to an enlarged scale of the whole device and increased weight thereof. Therefore, this device may not be easily applied to a small-sized terminal such a mobile device.

In this specification, the technology is proposed which inhibits potential of an enlarged scale of a whole device as well as can give the user the force sensation.

2. Functions of Signal Control System

Subsequently, a description is given of functions of the signal control system 1 according to an embodiment of the present disclosure. FIG. 1 is a diagram illustrating an exemplary configuration of the signal control system 1 according to an embodiment of the present disclosure. As shown in FIG. 1, the signal control system 1 according to an embodiment of the present disclosure includes a signal control device 10 and a vibratory device 20. The signal control device 10 includes a data acquisition unit 111 configured to acquire predetermined data, a signal control unit 112 configured to control an input signal for the vibratory device 20, and a signal output unit 113 configured to output the input signal for the vibratory device 20.

Functions of these functional blocks constituting the signal control device 10 will be described later in detail. An acceleration of the vibratory device 20 is varied in response to the input signal from the signal control device 10. The variation of acceleration of the vibratory device 20 made in this way can vibrate the vibratory device 20. Note that a concrete configuration of the vibratory device 20 is not particularly limited, but in this specification, a description is given of, as an example, a case where the vibratory device 20 is constituted by a predetermined vibration generation device.

Figure 2:
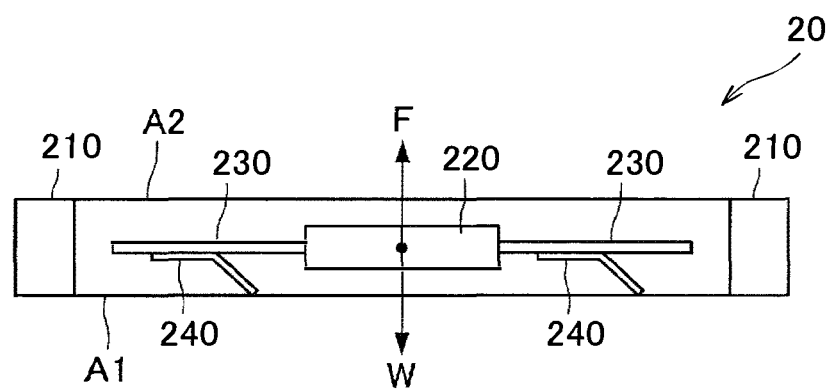
FIG. 2 is a diagram illustrating an exemplary configuration of a vibratory device in a case where an applied voltage is a reference voltage.

Hereinafter, a description is continued using as an example the case where the vibratory device 20 is a predetermined vibration generation device. First, a description is given of a case where an applied voltage is a reference voltage. FIG. 2 is a diagram illustrating an exemplary configuration of the vibratory device 20 in a case where the applied voltage is the reference voltage. As shown in FIG. 2, the vibratory device 20 includes a magnet 210, coil 220, weight 230, and elastic body 240. Note that in this specification, a case of the reference voltage of 0 V is mainly described, but the reference voltage is not particularly limited.

In this specification, a case of the magnet 210 formed of a permanent magnet is mainly described, but the magnet 210 may be a permanent magnet. Additionally, in this specification, a case of the elastic body 240 formed of a spring is mainly described, but a kind of the elastic body 240, not particularly limited, may be a rubber or other elastic bodies. The respective numbers of the magnet 210, the coil 220, the weight 230, and the elastic body 240 are not particularly limited.

With reference to FIG. 2, since the signal control unit 112 has the applied voltage set to the reference voltage, no input signal to the coil 220 is generated. Therefore, a gravity W acting on the weight 230 balances a force F acting from the elastic body 240 to the weight 230. Subsequently, assume that the signal control unit 112 varies the applied voltage. Concretely, the signal control unit 112 varies the applied voltage between the reference voltage and a first voltage. The first voltage is not particularly limited.

Figure 3:
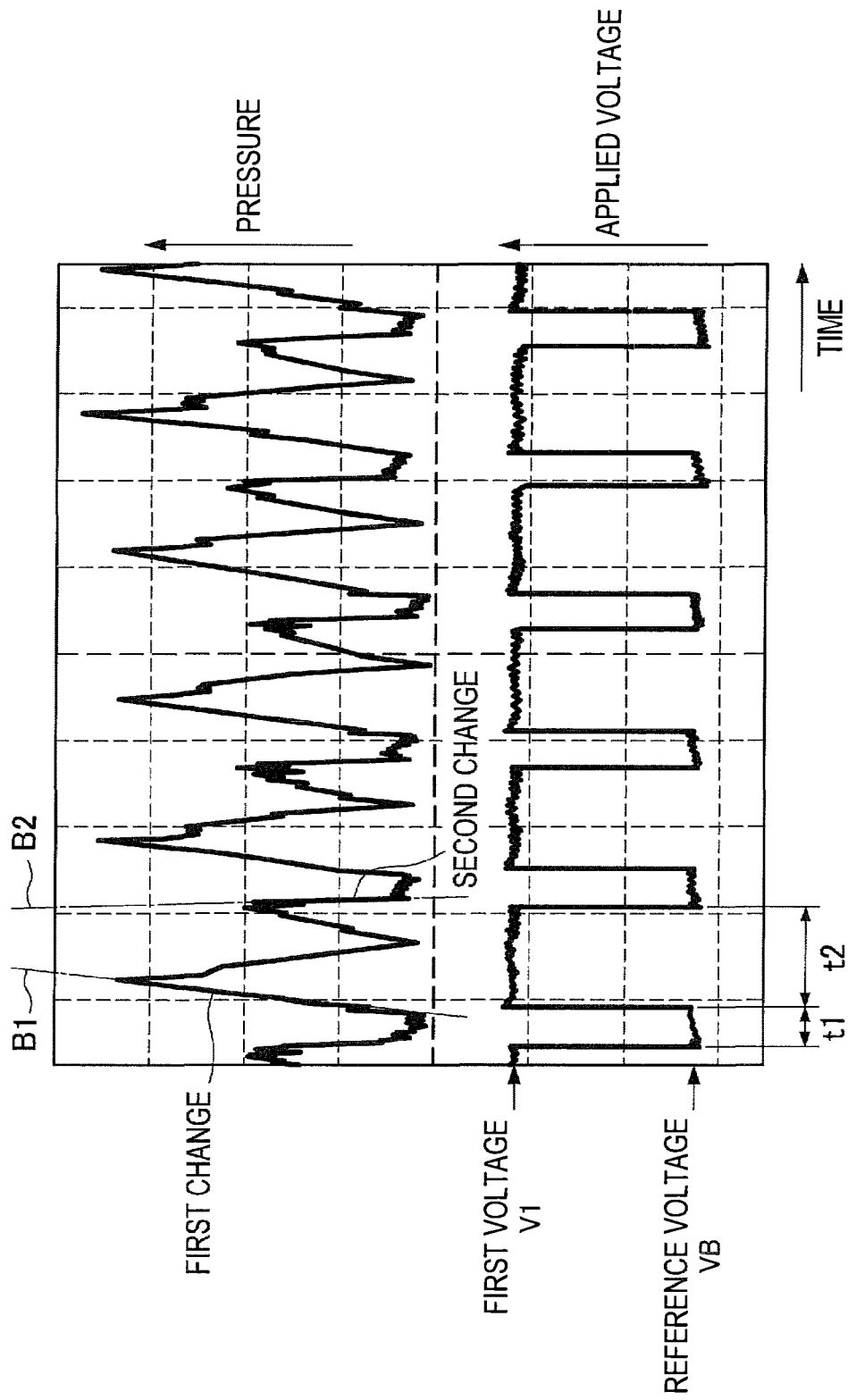
FIG. 3 is a diagram illustrating an exemplary temporal variation of a pressure exerted outward by the vibratory device in a case where the applied voltage is varied between the reference voltage and a first voltage.

FIG. 3 is a diagram illustrating an exemplary temporal variation of a pressure exerted outward by the vibratory device 20 in a case where the applied voltage is varied between a reference voltage VB and a first voltage V1. In the example shown in FIG. 3, the pressure exerted outward by the vibratory device 20 is measured by a pressure sensor which is provided at a position externally contact with a surface A1 of the vibratory device 20. Therefore, in the example shown in FIG. 3, a negative pressure is not measured. There is no particular limitation on respective lengths of a time period t1 while the reference voltage VB is applied and a time period t2 while the first voltage V1 is applied. The number of cycles of varying the applied voltage is not limited.

As shown in FIG. 3, when the signal control unit 112 varies the applied voltage from the reference voltage VB to the first voltage V1, the pressure is changed (see "first change" in FIG. 3). At this time, the input signal to the coil 220 is also changed from a reference level to a first level. In more detail, a current of the input signal may be changed depending on the applied voltage. For example, the current of the input signal may be changed in proportion to the applied voltage.

Figure 4:
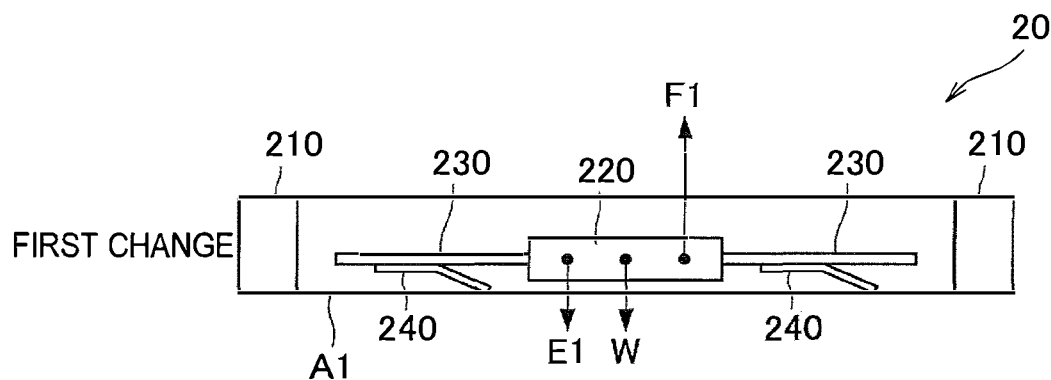
FIG. 4 is a diagram illustrating an exemplary configuration of the vibratory device in a case of a first change.

FIG. 4 is a diagram illustrating an exemplary configuration of the vibratory device 20 in the case of the first change. In the case where the input signal to the coil 220 is changed from the reference level to the first level (first change), a force E1 corresponding to a magnetic field generated by the magnet 210 and input signal flowing through the coil 220 is applied to the weight 230. As a result of the application of the force E1 to the weight 230, the weight 230 is moved in a predetermined direction (downward in the example shown in FIG. 4).

However, the weight 230 is given a force F1 from the elastic body 240 in a direction (upward in the example shown in FIG. 4) opposite to the predetermined direction. Therefore, variation of acceleration of the weight 230 is relatively gentle and a magnitude of a variation amount of acceleration per unit time generated in the vibratory device 20 is relatively small. With reference to FIG. 3, in the case of the first change, a variation amount B1 of the pressure per unit time follows a relative gentle slope.

Subsequently, as shown in FIG. 3, when the signal control unit 112 varies the applied voltage from the first voltage V1 to the reference voltage VB, the pressures is changed (see "second change" in FIG. 3). At this time, the input signal to the coil 220 is also changed from the first level to the reference level. In more detail, a current of the input signal may be changed depending on the applied voltage. For example, the current of the input signal may be changed in proportion to the applied voltage.

Figure 5:
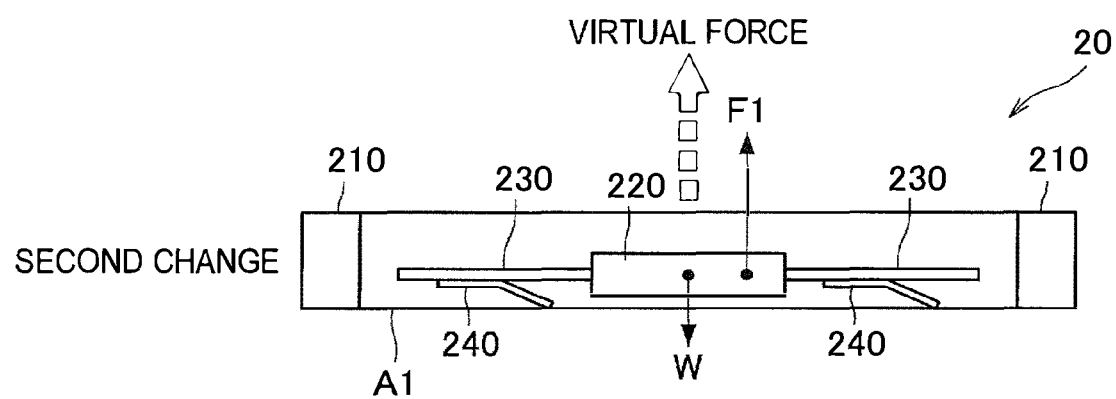
FIG. 5 a diagram illustrating an exemplary configuration of the vibratory device in a case of a second change.

FIG. 5 is a diagram illustrating an exemplary configuration of the vibratory device 20 in the case of the second change. In the case where the input signal to the coil 220 is changed from the first level to the reference level (second change), no current flows through the coil 220 and thus the force corresponding to the magnetic field generated by the magnet 210 and input signal flowing through the coil 220 is not applied to the weight 230.

On the other hand, the weight 230 is given the force F1 from the elastic body 240 in a direction (upward in the example shown in FIG. 4) opposite to the predetermined direction. Therefore, the variation of acceleration of the weight 230 is relatively steep and the magnitude of the variation amount of acceleration per unit time generated in the vibratory device 20 is relatively large. With reference to FIG. 3, in the case of the second change, a variation amount B2 of the pressure per unit time follows a relative steep slope.

As described above, between the cases where the input signal for the vibratory device 20 is changed from the reference level to the first level (first change) and where from the first level to reference level (second change), the magnitudes of the variation amount of acceleration per unit time generated in the vibratory device 20 are different from each other. In such a situation, the signal control unit 112 may controls the input signal to vary from the reference level to the first level and from the first level to the reference level.

According to such a configuration, in the case of the first change, the magnitude of the variation amount of acceleration per unit time generated in the vibratory device 20 is relatively small, but in the case of the second change, the magnitude of the variation amount of acceleration per unit time generated in the vibratory device 20 is relatively large. Here, as described above, a relationship between a force actually acting on the user and a force sensation sensed by the user when the user perceives the force actually acting on himself/herself is not a simple proportional relationship, but may follow an S-curve.

Therefore, in the case where the magnitude of the variation amount of acceleration per unit time generated in the vibratory device 20 is relatively large, the user may develop illusions as if he/she is given a force from the vibratory device 20 in a direction that the acceleration is varied ("virtual force" shown in FIG. 5). In this way, according to this technology, the force sensation can be given to the user. In addition, according to such a configuration, it is sufficient to vary the input signal for the vibratory device 20, allowing the potential of the enlarged scale of the whole device to be inhibited.

A timing for giving the user the force sensation is not particularly limited. For example, the signal control unit 112 may determine whether or not the input signal is to be varied from the reference level to the first level (first change) and from the first level to the reference level (second change) on the basis of predetermined data. With such a manner of changing, the force sensation may be given at a timing suitable for the user. The predetermined data may be data detected by a sensor including positional information detected by a GPS (Global Positioning System) sensor and infrared ray detected by an infrared sensor.

The above description mainly describes the example in which one kind of force sensation can be given to the user, but the force sensation given to the user is not limited to one kind. According the technology in the present disclosure, two or more kinds of force sensations can be also given to the user. For example, if the change caused in the input signal for the vibratory device 20 is made different, two or more kinds of force sensations can be also given to the user. A description is given below of a case where the user is given the force sensation in the direction opposite to the "virtual force" shown in FIG. 5 as an example.

Figure 6:
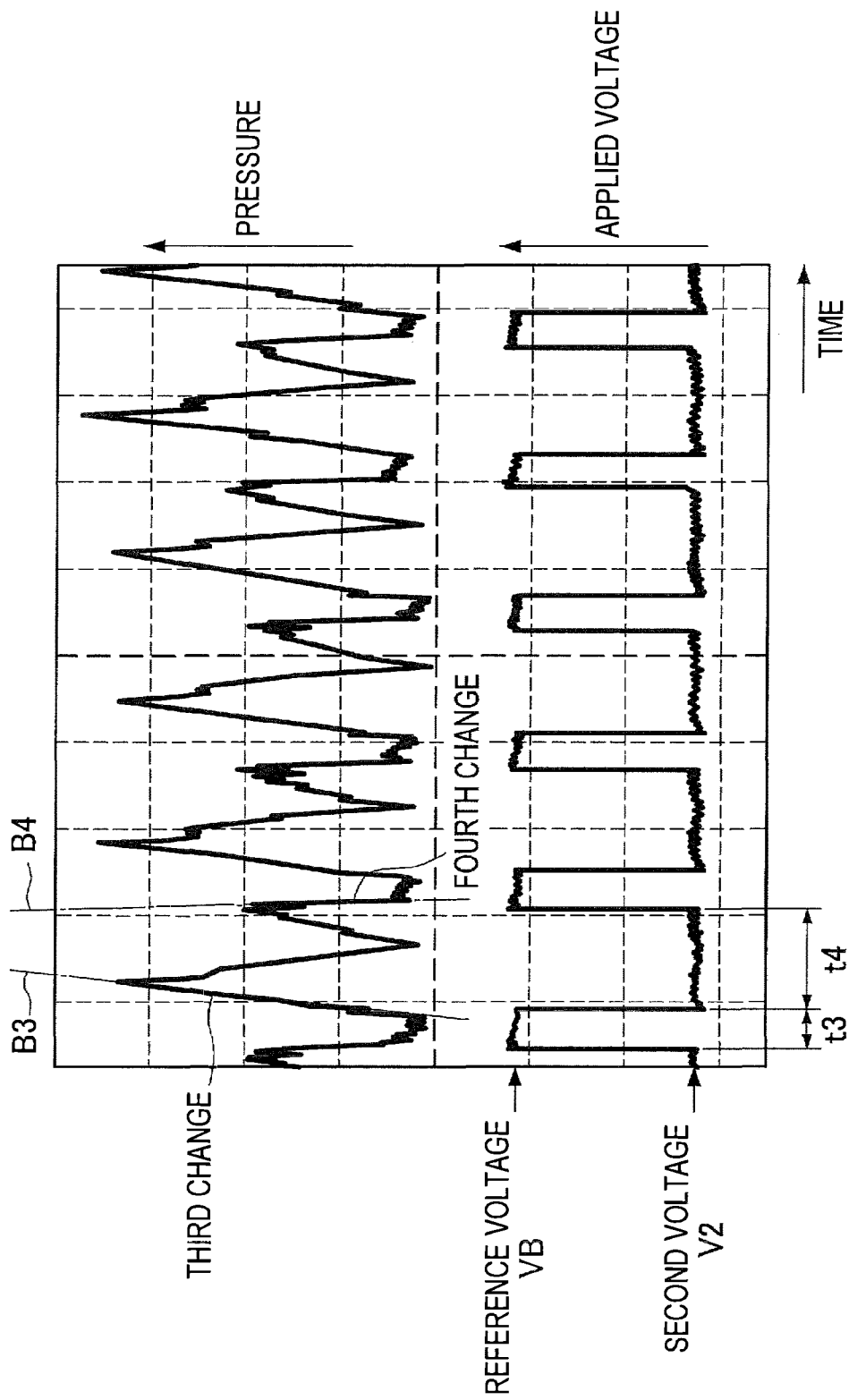
FIG. 6 is a diagram illustrating an exemplary temporal variation of a pressure exerted outward by the vibratory device in a case where the applied voltage is varied between the reference voltage and a second voltage.

FIG. 6 is a diagram illustrating an exemplary temporal variation of a pressure exerted outward by the vibratory device 20 in a case where the applied voltage is varied between the reference voltage VB and a second voltage V2. In the example shown in FIG. 6, the pressure exerted outward by the vibratory device 20 is measured by a pressure sensor which is provided at a position externally contact with a surface A2 of the vibratory device 20. Therefore, in the example shown in FIG. 6, a negative pressure is not measured. There is no particular limitation on respective lengths of a time period t3 while the reference voltage VB is applied and a time period t2 while the second voltage V2 is applied. The number of cycles of varying the applied voltage is not limited.

The example shown in FIG. 6 assumes that one of the first voltage V1 and the second voltage V2 has a positive value and the other one of them has a negative value. In such a case, directions of the currents flowing through the coil 220 are inverse to each other between the cases where the applied voltage is the first voltage V1 and where the second voltage V2, and thus, the force applied to the weight 230 corresponding to the magnetic field generated by the magnet 210 and input signal flowing the through coil 220 has also an inverse direction.

As shown in FIG. 6, when the signal control unit 112 varies the applied voltage from the reference voltage VB to the second voltage V2, the pressure is changed (see "third change" in FIG. 6). At this time, the input signal to the coil 220 is also changed from the reference level to a second level. In more detail, a current of the input signal may be changed depending on the applied voltage. For example, the current of the input signal may be changed in proportion to the applied voltage.

Figure 7:
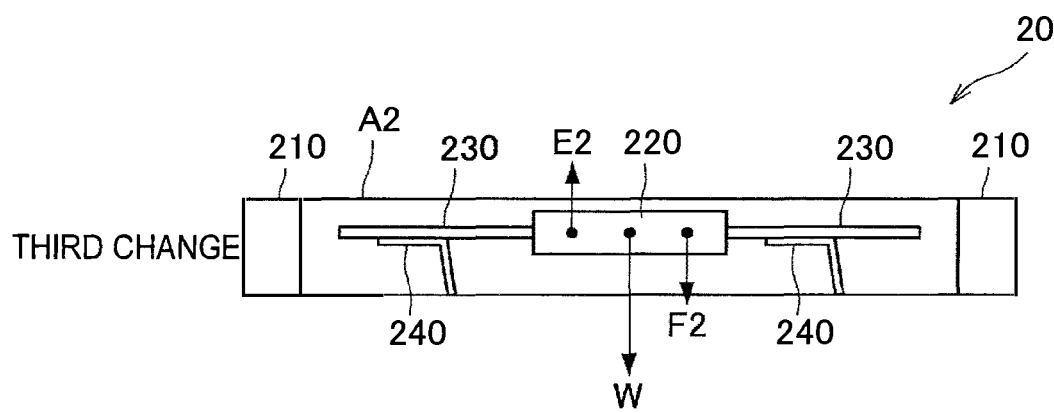
FIG. 7 is a diagram illustrating an exemplary configuration of the vibratory device in a case of a third change.

FIG. 7 is a diagram illustrating an exemplary configuration of the vibratory device 20 in the case of the third change. In the case where the input signal to the coil 220 is changed from the reference level to the second level (second change), a force E2 corresponding to the magnetic field generated by the magnet 210 and input signal flowing through the coil 220 is applied to the weight 230. As a result of the application of the force E2 to the weight 230, the weight 230 is moved in a predetermined direction (upward in the example shown in FIG. 7).

However, the weight 230 is given a force F2 from the elastic body 240 in a predetermined direction (downward in the example shown in FIG. 6). Therefore, the variation of acceleration of the weight 230 is relatively gentle and the magnitude of the variation amount of acceleration per unit time generated in the vibratory device 20 is relatively small. With reference to FIG. 6, in the case of the third change, a variation amount B3 of the pressure per unit time follows a relative gentle slope.

Subsequently, as shown in FIG. 6, when the signal control unit 112 varies the applied voltage from the second voltage V2 to the reference voltage VB, the pressures is changed (see "fourth change" in FIG. 6). At this time, the input signal to the coil 220 is also changed from the second level to the reference level. In more detail, a current of the input signal may be changed depending on the applied voltage. For example, the current of the input signal may be changed in proportion to the applied voltage.

Figure 8:
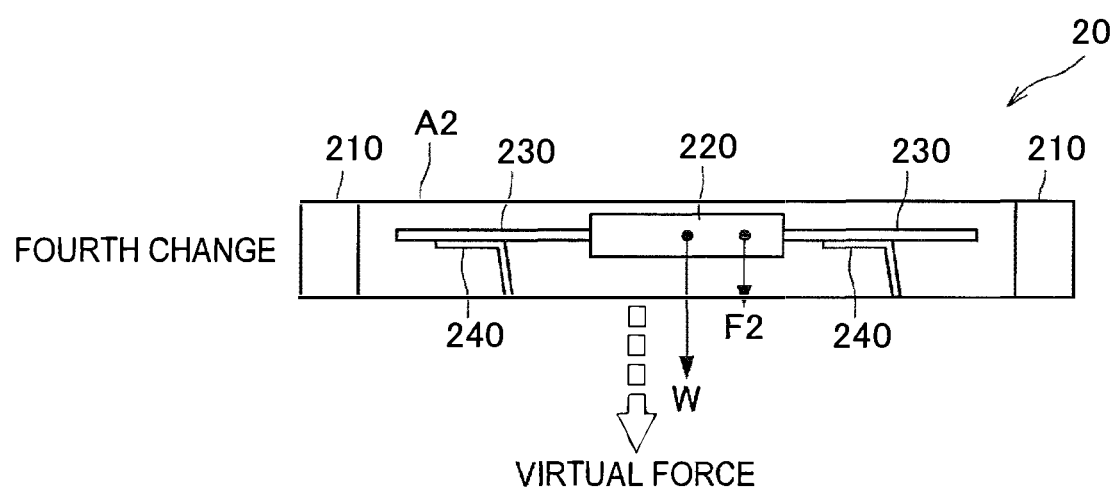
FIG. 8 is a diagram illustrating an exemplary configuration of the vibratory device in a case of a fourth change.

FIG. 8 is a diagram illustrating an exemplary configuration of the vibratory device 20 in the case of the fourth change. In the case where the input signal to the coil 220 is changed from the second level to the reference level (fourth change), no current flows through the coil 220 and thus the force corresponding to the magnetic field generated by the magnet 210 and input signal flowing through the coil 220 is not applied to the weight 230.

On the other hand, the weight 230 is given the force F2 from the elastic body 240 in a predetermined direction (downward in the example shown in FIG. 8). Therefore, the variation of acceleration of the weight 230 is relatively steep and the magnitude of the variation amount of acceleration per unit time generated in the vibratory device 20 is relatively large. With reference to FIG. 6, in the case of the fourth change, a variation amount B4 of the pressure per unit time follows a relative steep slope.

As described above, between the cases where the input signal for the vibratory device 20 is changed from the reference level to the second level (third change) and where from the second level to reference level (fourth change), the magnitudes of the variation amount of acceleration per unit time generated in the vibratory device 20 are different. In such a situation, the signal control unit 112 may controls the input signal to vary from the reference level to the second level and from the second level to the reference level.

According to such a configuration, in the case of the third change, the magnitude of the variation amount of acceleration per unit time generated in the vibratory device 20 is relatively small, but in the case of the fourth change, the magnitude of the variation amount of acceleration per unit time generated in the vibratory device 20 is relatively large. Therefore, for the reason similar to the example described above, in the case where the magnitude of the variation amount of acceleration per unit time generated in the vibratory device 20 is relatively large, the user may develop illusions as if he/she is given a force from the vibratory device 20 in a direction that the acceleration is varied ("virtual force" shown in FIG. 8).

In this way, according to this technology, the "virtual forces" respectively illustrated in FIG. 5 and FIG. 8 can be combined such that two kinds of force sensations may be given to the user. For example, as described above, if one of the first voltage V1 and the second voltage V2 has a positive value and the other one of them has a negative value, one of the above described first level and above described second level of the input signal has a positive value and the other one has a negative value, and thus, the acceleration generated in the vibratory device 20 has an inverse direction. Therefore, two kinds of force sensations inverse to each other in the direction thereof can be given to the user.

The above description mainly describes the example in which the force sensation of inverse direction is given to the user, but two kinds of force sensations are not limited to such an example. For example, two kinds of force sensations different to each other in the magnitude thereof may be given to the user. For example, if the first voltage V1 and the second voltage V2 are different to each other in the magnitude thereof, the above described first level and above described second level of the input signal are also different to each other in the magnitude thereof, and thus, the magnitudes of the acceleration generated in the vibratory device 20 are different to each other. Therefore, two kinds of force sensations different to each other in the magnitude thereof can be given to the user.

Additionally, for example, the above described first level and the above described second level may be different to each other in a duty ratio thereof. In more detail, a ratio of the time period t2 at the first level to one cycle and a ratio of a time period t4 at the second level to one cycle may be different to each other. In such a case, the magnitudes of the acceleration generated in the vibratory device 20 are different. Therefore, two kinds of force sensations different to each other in the magnitude thereof can be given to the user.

The force sensation given to the user may be determined from two or more kinds thereof. For example, the signal control unit 112 may determine, on the basis of predetermined data, whether the change from the reference level to the first level (first change) and the change from the first level to the reference level (second change) are exerted on the input signal, or the change from the reference level to the second level (third change) and the change from the second level to the reference level (fourth change) are exerted on the input signal. By doing so, the force sensation suitable for the user may be determined. The predetermined data may be data detected by a sensor similarly to the case where the timing for giving the user the force sensation is controlled.

As described above, the functions of the signal control system 1 according to an embodiment of the present disclosure are described.

3. Exemplary Use of Signal Control System

Subsequently, a description is given of an exemplary use of the signal control system 1 according to an embodiment of the present disclosure. As described above, the signal control system 1 may have various functions, and the signal control system 1 is applied to any case without limitation specifically. Here, with reference to FIG. 9 and FIG. 10, two exemplary uses of the signal control system 1 are described in order. First, with reference to FIG. 9, a description is given of a first exemplary use of the signal control system 1.

Figure 9:
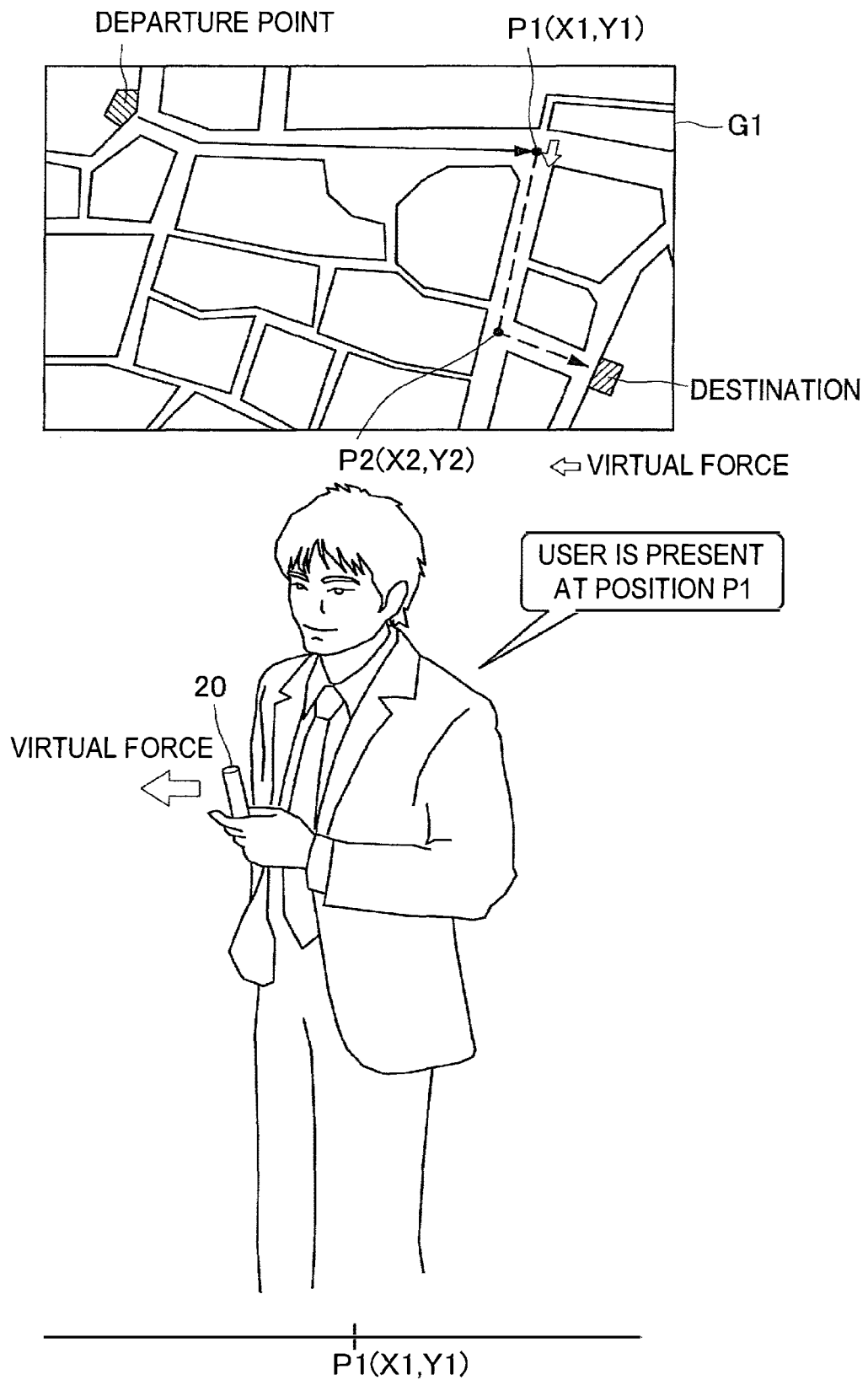
FIG. 9 is a diagram for explaining a first exemplary use of a signal control system.

FIG. 9 is a diagram for explaining the first exemplary use of the signal control system 1. In the example shown in FIG. 9, an illustration G1 is a view of surroundings of the user seen from the above, where the user, carrying the vibratory device 20 and a sensor configured to detect the user himself/herself, leaves a departure point, and is going to pass through a position P1 (X1, Y1) and a position P2 (X2, Y2) to go to a destination. At this time, assume a case of navigation for the user from the departure point to the destination. The sensor may be a GPS sensor.

In a case where the user has reached the position P1 (X1, Y1), there can be considered that the user is made to turn to the right such that the user can earlier reach the destination. Therefore, information about the position P1(X1, Y1) and the first level of the input signal which are associated with each other may be stored in advance. The first level of the input signal may be stored in advance such that the virtual force acts rightward.

Then, in a case where the position P1 (X1, Y1) stored in advance is detected by the sensor and acquired by the data acquisition unit 111, the signal control unit 112 may exert the change from the reference level to the first level (first change) and the change from the first level to the reference level (second change) on the input signal. In a case where the signal control unit 112 exerts such a change on the input signal, the user may be given the rightward force sensation (see "virtual force" shown in FIG. 9). In this way, according to this technology, the navigation for the user may be achieved.

Information about the position P2 (X2, Y2) and the second level of the input signal which are associated with each other may be additionally stored in advance. The second level of the input signal may be stored in advance such that the virtual force acts leftward. Then, in a case where the position P2 (X2, Y2) stored in advance is detected by the sensor and acquired by the data acquisition unit 111, the signal control unit 112 may exert the change from the reference level to the second level (third change) and the change from the second level to the reference level (fourth change) on the input signal.

In a case where the signal control unit 112 exerts such a change on the input signal, the user can be given the leftward force sensation. In this way, the signal control unit 112 may determine, on the basis of the position of the user, whether the change from the reference level to the first level (first change) and the change from the first level to the reference level (second change) are exerted on the input signal, or the change from the reference level to the second level (third change) and the change from the second level to the reference level (fourth change) are exerted on the input signal. By doing so, the navigation more convenient for the user may be achieved.

FIG. 10 is a diagram for explaining a second exemplary use of the signal control system 1. In the example shown in FIG. 10, an illustration G2 is a view of surroundings of the user seen from the above, where the user, looking to a downward direction in the illustration G2 and carrying the vibratory device 20 and a sensor configured to detect a region in which the user is present himself/herself, is going to go to a position of a borderline L1 between a region R1 and a region R2. At this time, assume a case of navigation for the user to the position borderline L1. The sensor may be an infrared sensor configured to detect an infrared ray. Assume that the infrared ray is irradiated to the region R2.

In a case where the user is present at the region R2, there can be considered that the user is made to proceed rightward such that the user can earlier reach the borderline L1. Since the sensor detects the infrared ray while the user is present at the region R2, information about a state where the infrared ray is being detected and the first level of the input signal which are associated with each other may be stored in advance. The first level the input signal may be stored in advance such that the virtual force acts rightward.

Then, in a case where the infrared ray is detected by the sensor and acquired by the data acquisition unit 111, the signal control unit 112 may exert the change from the reference level to the first level (first change) and the change from the first level to the reference level (second change) on the input signal. In a case where the signal control unit 112 exerts such a change on the input signal, the user may be given the rightward force sensation (see "virtual force" shown in FIG. 9). In this way, according to this technology, the navigation for the user may be achieved.

Information about a state where the infrared ray is not detected and the second level of the input signal which are associated with each other may be additionally stored in advance. The second level of the input signal may be stored in advance such that the virtual force acts leftward. Then, in a case where infrared ray is not detected by the sensor and acquired by the data acquisition unit 111, the signal control unit 112 may exert the change from the reference level to the second level (third change) and the change from the second level to the reference level (fourth change) on the input signal.

In a case where the signal control unit 112 exerts such a change on the input signal, the user can be given the leftward force sensation. In this way, the signal control unit 112 may determine, on the basis of the position of the user, whether the change from the reference level to the first level (first change) and the change from the first level to the reference level (second change) are exerted on the input signal, or the change from reference level to the second level (third change) and the change from the second level to the reference level (fourth change) are exerted on the input signal. By doing so, the navigation more convenient for the user may be achieved.

4. Conclusion

As described above, according to the embodiment of the present disclosure, signal control device 10 is provided which includes the signal output unit 113 configured to output the input signal for the vibratory device 20 and the signal control unit 112 configured to control the input signal, and between the cases where the change from the reference level to the first level is exerted on the input signal and where the change from the first level to the reference level is exerted on the input signal, the magnitudes of the variation amount of acceleration per unit time generated in the vibratory device 20 are different from each other, and the signal control unit 112 exerts the change from the reference level to the first level and the change from the first level to the reference level on the input signal.

According to such a configuration, the force sensation can be given to the user. According to such a configuration, it is sufficient to vary the input signal for the vibratory device 20, allowing the potential of the enlarged scale of the whole device to be inhibited.

It should be understood by those skilled in the art that various modifications, combinations, sub-combinations and alterations may occur depending on design requirements and other factors insofar as they are within the scope of the appended claims or the equivalents thereof.

For example, in the exemplary use of the signal control system 1, the example is described in which the user directly carries the vibratory device 20, but the user may carry indirectly the vibratory device 20 which is installed in some object. For example, the vibratory device 20 may be installed in a writing material, smartphone, tablet terminal, PDA (Personal Digital Assistants), digital camera, video camera, PC (Personal Computer), mobile phone, mobile music player, mobile game console and the like.

The vibratory device 20 may be attached to a body of the user directly, an object the user wares (e.g., socks, clothes, shoes, hat and the like), eye glasses, HMD (Head Mount display), or a finger ring. In addition, the vibratory device 20 may be installed in a walking stick or the like carried by the user with impaired vision for achieving the navigation for the user with impaired vision.

Additionally, the present technology may also be configured as below.

(1) A signal control device including:
a signal output unit configured to output a signal for a vibratory device; and
a signal control unit configured to control the signal,
wherein between a case where a change from a reference level to a first level is exerted on the signal and a case where a change from the first level to the reference level is exerted on the signal, magnitudes of variation amounts of acceleration per unit time generated in the vibratory device are different from each other, and wherein the signal control unit exerts the change from the reference level to the first level and the change from the first level to the reference level on the signal.

(2) The signal control device according to (1), wherein between a case where a change from the reference level to a second level is exerted on the signal and a case where a change from the second level to the reference level is exerted on the signal, a magnitudes of variation amounts of acceleration per unit time generated in the vibratory device are different from each other, and wherein the signal control unit exerts the change from the reference level to the second level and the change from the second level to the reference level on the signal.

(3) The signal control device according to (2), wherein one of the first level and the second level has a positive value and the other one of the first level and the second level has a negative value.

(4) The signal control device according to (2), wherein the first level and the second level are different from each other in the magnitude.

(5) The signal control device according to (2), wherein the first level and the second level are different from each other in a duty ratio.

(6) The signal control device according to any one of (1) to (5), wherein the signal control unit determines, on the basis of predetermined data, whether to exert the change from the reference level to the first level and the change from the first level to the reference level on the signal.

(7) The signal control device according to (6), wherein the signal control unit determines, on the basis of predetermined data, whether to exert the change from the reference level to the first level and the change from the first level to the reference level on the signal, or the change from the reference level to a second level and the change from the second level to the reference level are exerted on the signal.

(8) A signal control system including:

a vibratory device; and a signal control device, wherein the signal control device includes a signal output unit configured to output a signal for the vibratory device, and a signal control unit configured to control the signal, wherein the signal control unit exerts a change from a reference level to a first level and a change from the first level to the reference level on the signal, and wherein between a case where the change from the reference level to the first level is exerted on the signal and a case where the change from the first level to the reference level is exerted on the signal, magnitudes of variation amounts of acceleration per unit time generated in the vibratory device are different from each other.

What is claimed is:

1. A signal control device, comprising:
   circuitry configured to:
   output a signal to a vibratory device;
   control a signal level of the signal;
   determine a change of the signal level from a reference level to a first level based on a geographical position of the vibratory device;
   determine a change of the signal level from the first level to the reference level based on the geographical position of the vibratory device; and
   control the vibratory device to generate
   a first variation amount of acceleration per unit time in the vibratory device, wherein the first variation amount is generated based on the change of the signal level from the reference level to the first level, and
   a second variation amount of acceleration per unit time in the vibratory device, wherein the second variation amount is generated based on the change of the signal level from the first level to the reference level, wherein
   the second variation amount is larger than the first variation amount, and
   the reference level is smaller than the first level.

2. The signal control device according to claim 1, wherein the circuitry is further configured to:
   change the signal level from the reference level to a second level for generation of a third variation amount of acceleration per unit time in the vibratory device; and
   change the signal level from the second level to the reference level for generation of a fourth variation amount of acceleration per unit time in the vibratory device, and
   the fourth variation amount is larger than the third variation amount.

3. The signal control device according to claim 2, wherein
   a first one of the first level or the second level has a positive value, and
   a second one of the first level or the second level has a negative value.

4. The signal control device according to claim 2, wherein a magnitude of the first level is different from a magnitude of the second level.

5. The signal control device according to claim 2, wherein a duty ratio of the first level is different from a duty ratio of the second level.

6. The signal control device according to claim 2, wherein the circuitry is further configured to:
   determine the change of the signal level from the reference level to the second level based on at least one of the geographical position of the vibratory device or an infrared signal acquired by an infrared sensor; and
   determine the change of the signal level from the second level to the reference level based on the at least one of the geographical position of the vibratory device or the infrared signal acquired by the infrared sensor.

7. A signal control system, comprising:
   a vibratory device; and
   a signal control device, wherein the signal control device includes circuitry configured to:
   output a signal to the vibratory device;
   control a signal level of the signal;
   determine a change of the signal level from a reference level to a first level based on a geographical position of the vibratory device;
   determine a change of the signal level from the first level to the reference level based on the geographical position of the vibratory device; and
   control the vibratory device to generate
   a first variation amount of acceleration per unit time in the vibratory device, wherein the first variation amount is generated based on the change of the signal level from the reference level to the first level, and
   a second variation amount of acceleration per unit time in the vibratory device, wherein the second variation amount is generated based on the change of the signal level from the first level to the reference level, wherein the second variation amount is larger than the first variation amount, and the reference level is smaller than the first level.

8. A signal control device, comprising:

circuitry configured to:

output an asymmetric signal to a vibratory device to generate a tactile force in the vibratory device, wherein the asymmetric signal has a reference level in a first time period and a first level in a second time period, the first time period is different from the second time period, the generation of the tactile force is based on an asymmetric variation of acceleration of the vibratory device, the tactile force is in a first direction based on a first polarity of the asymmetric signal, the tactile force is in a second direction based on a second polarity of the asymmetric signal, the second polarity is inverse to the first polarity, and the second direction is different from the first direction;

control a signal level of the asymmetric signal;

determine a change of the signal level from the reference level to the first level based on a geographical position of the vibratory device;

determine a change of the signal level from the first level to the reference level based on the geographical position of the vibratory device; and control the vibratory device to generate a first variation amount of acceleration per unit time in the vibratory device, wherein the first variation amount is generated based on the change of the signal level from the reference level to the first level, and a second variation amount of acceleration per unit time in the vibratory device, wherein the second variation amount is generated based on the change of the signal level from the first level to the reference level, wherein the second variation amount is larger than the first variation amount, and the reference level is smaller than the first level.

9. The signal control device according to claim 8, wherein the asymmetric signal has the reference level in a third time period, the circuitry is further configured to:

change a signal level of the asymmetric signal from the reference level to a second level in a fourth time period for generation of a third variation amount of acceleration per unit time in the vibratory device, wherein the third time period is different from the fourth time period, and the second level has the second polarity; and change the signal level of the asymmetric signal from the second level to the reference level for generation of a fourth variation amount of acceleration per unit time in the vibratory device, and the fourth variation amount is larger than the third variation amount.

10. The signal control device according to claim 9, wherein the circuitry is further configured to:

determine the change of the signal level of the asymmetric signal from the reference level to the second level based on at least one of the geographical position of the vibratory device or an infrared signal acquired by an infrared sensor; and determine the change of the signal level of the asymmetric signal from the second level to the reference level based on the at least one of the geographical position of the vibratory device or the infrared signal acquired by the infrared sensor.

* * * * *